(12) United States Patent
Mihalos et al.

(10) Patent No.: US 8,282,379 B2
(45) Date of Patent: Oct. 9, 2012

(54) PRODUCTION OF THIN, IRREGULAR CHIPS WITH SCALLOPED EDGES AND SURFACE BUBBLES

(75) Inventors: Mihaelos N. Mihalos, Palisades Park, NJ (US); Jessica H. Schwartzberg, Maplewood, NJ (US); Theodore N. Janulis, Randolph, NJ (US); Barbara E. Baumann, Bedminster, NJ (US); Stephanie M. Ferguson, Montclair, NJ (US); Zena E. Forte, Blairstown, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 247 days.

(21) Appl. No.: 12/537,156

(22) Filed: Aug. 6, 2009

(65) Prior Publication Data
US 2010/0159102 A1   Jun. 24, 2010

Related U.S. Application Data

(62) Division of application No. 10/371,547, filed on Feb. 21, 2003, now abandoned.

(60) Provisional application No. 60/402,304, filed on Aug. 9, 2002.

(51) Int. Cl.
*A23P 1/10* (2006.01)

(52) U.S. Cl. ........ 425/308; 425/315; 425/316; 426/503; 426/518

(58) Field of Classification Search .................. 425/308, 425/315, 316; 426/503, 518
See application file for complete search history.

(56) References Cited

U.S. PATENT DOCUMENTS

| D20,662 S | 4/1891 | Pearson |
|---|---|---|
| D22,990 S | 12/1893 | Mackey |
| D23,078 S | 2/1894 | Ivins |
| D28,785 S | 6/1898 | Perky |
| D31,777 S | 10/1899 | Fox |
| 678,749 A | 7/1901 | Moore et al. |
| 1,039,912 A | 10/1912 | Dollings |
| 1,169,023 A | 1/1916 | Embrey |
| 1,975,326 A | 10/1934 | Loose et al. |

(Continued)

FOREIGN PATENT DOCUMENTS

CA   637258   2/1962

(Continued)

OTHER PUBLICATIONS

Chemical Abstract #58556d of 17—Foods. vol. 80, 1974.

(Continued)

*Primary Examiner* — Yogendra Gupta
*Assistant Examiner* — Joseph Leyson
(74) *Attorney, Agent, or Firm* — Greenblum & Bernstein, P.L.C.

(57) ABSTRACT

A dough sheet for producing thin, baked chips is obtained continuously by compressing a dough sheet to a thickness of less than or equal to about 0.035 inch between counter-rotating gauge rolls while maintaining the surface of each gauge roll at a temperature of about 85° F. to about 95° F. Maintaining the gauge roll surface temperature at about 85° F. to about 95° F. avoids sticking, tearing, and shredding of the thin dough sheet as it is compressed and transferred by the gauge rolls, even at high production rates or line speeds. A rotary cutter is employed to obtain thin, irregularly shaped, scallop-edged snacks in a variety of shapes from a single dough sheet without producing dough scraps between the pieces.

11 Claims, 8 Drawing Sheets

U.S. PATENT DOCUMENTS

| | | |
|---|---|---|
| 2,201,045 A | 6/1940 | Meacham |
| 2,505,407 A | 4/1950 | Johnson |
| 2,584,893 A | 2/1952 | Lloyd |
| 2,704,257 A | 3/1955 | Diez de Sollano et al. |
| 2,767,667 A | 10/1956 | Spooner |
| 2,823,625 A | 2/1958 | Oakes |
| 2,859,121 A | 11/1958 | Avera |
| 2,905,559 A | 9/1959 | Anderson et al. |
| 2,998,318 A | 8/1961 | Forkner |
| 3,027,258 A | 3/1962 | Markakis et al. |
| 3,089,773 A | 5/1963 | Bates et al. |
| 3,131,063 A | 4/1964 | d'Arnaud Gerkins |
| 3,194,664 A | 7/1965 | Eytinge |
| 3,259,503 A | 7/1966 | Tan et al. |
| 3,276,397 A | 10/1966 | Poppe et al. |
| 3,278,311 A | 10/1966 | Brown et al. |
| 3,332,781 A | 7/1967 | Benson et al. |
| 3,348,950 A | 10/1967 | Weiss |
| 3,369,908 A | 2/1968 | Gonzalez et al. |
| 3,384,495 A | 5/1968 | Potter et al. |
| 3,451,822 A | 6/1969 | Fast et al. |
| 3,493,390 A | 2/1970 | Socco |
| 3,519,432 A | 7/1970 | Socco et al. |
| 3,539,356 A | 11/1970 | Benson et al. |
| 3,545,979 A | 12/1970 | Ghafoori |
| 3,600,193 A | 8/1971 | Glabe et al. |
| 3,615,658 A | 10/1971 | Glabe |
| 3,615,697 A | 10/1971 | Hollenbeck |
| 3,652,294 A | 3/1972 | Marotta et al. |
| 3,666,511 A | 5/1972 | Williams et al. |
| 3,677,769 A | 7/1972 | King |
| 3,690,895 A | 9/1972 | Amadon et al. |
| 3,698,309 A | 10/1972 | Steels |
| 3,698,914 A | 10/1972 | Kortschot et al. |
| 3,698,915 A | 10/1972 | Glasgow |
| 3,753,729 A | 8/1973 | Harms et al. |
| 3,753,735 A | 8/1973 | Gerkens |
| 3,787,588 A | 1/1974 | Turitz |
| 3,796,812 A | 3/1974 | Baensch |
| 3,800,050 A | 3/1974 | Popel |
| 3,821,441 A | 6/1974 | Tomita et al. |
| 3,857,982 A | 12/1974 | Sevenants |
| 3,860,735 A | 1/1975 | Hoshino |
| 3,864,505 A | 2/1975 | Hunter et al. |
| 3,873,748 A | 3/1975 | Schwab et al. |
| 3,886,291 A | 5/1975 | Willard |
| 3,899,602 A | 8/1975 | Rutenberg et al. |
| 3,922,370 A | 11/1975 | Prakash |
| 3,925,567 A | 12/1975 | Abe |
| 3,935,322 A | 1/1976 | Weiss et al. |
| 3,937,848 A | 2/1976 | Campbell et al. |
| 3,946,116 A | 3/1976 | Weaver et al. |
| 3,956,517 A | 5/1976 | Curry et al. |
| 3,977,897 A | 8/1976 | Wurzburg et al. |
| 3,982,032 A | 9/1976 | Koizumi |
| 3,988,875 A | 11/1976 | Fay |
| 3,997,684 A | 12/1976 | Willard |
| 3,998,975 A | 12/1976 | Liepa |
| 4,005,139 A | 1/1977 | Kortschot et al. |
| 4,017,460 A | 4/1977 | Tessler |
| 4,044,166 A | 8/1977 | Koizumi |
| 4,053,650 A | 10/1977 | Chino et al. |
| D247,071 S | 1/1978 | Neidenberg et al. |
| 4,073,958 A | 2/1978 | Abe |
| 4,109,012 A | 8/1978 | Bates et al. |
| 4,109,024 A | 8/1978 | Cremer |
| 4,112,222 A | 9/1978 | Jarowenko |
| 4,122,198 A | 10/1978 | Wisdom et al. |
| 4,126,706 A | 11/1978 | Hilton |
| 4,135,004 A | 1/1979 | Finkel |
| 4,140,801 A | 2/1979 | Hilton et al. |
| 4,163,804 A | 8/1979 | Meyer et al. |
| 4,167,588 A | 9/1979 | Willard |
| 4,170,659 A | 10/1979 | Totino et al. |
| 4,207,355 A | 6/1980 | Chiu et al. |
| 4,208,476 A | 6/1980 | Tsao |
| 4,209,536 A | 6/1980 | Dogliotti |
| 4,229,489 A | 10/1980 | Chiu et al. |
| 4,238,517 A | 12/1980 | Bosley et al. |
| 4,266,920 A | 5/1981 | Hayashi et al. |
| 4,272,554 A | 6/1981 | Schroeder et al. |
| 4,277,510 A | 7/1981 | Wicklund et al. |
| 4,293,582 A | 10/1981 | Hamann et al. |
| 4,308,286 A | 12/1981 | Anstett et al. |
| 4,312,892 A | 1/1982 | Rubio |
| 4,326,455 A | 4/1982 | Rubio |
| 4,348,166 A | 9/1982 | Fowler |
| 4,362,754 A | 12/1982 | Wegner et al. |
| 4,391,836 A | 7/1983 | Chiu |
| 4,409,250 A | 10/1983 | Van Hulle et al. |
| 4,418,088 A | 11/1983 | Cantenot |
| 4,439,459 A | 3/1984 | Swartley |
| 4,446,163 A | 5/1984 | Galle et al. |
| 4,455,321 A | 6/1984 | Glabe et al. |
| 4,499,113 A | 2/1985 | Mochizuki et al. |
| 4,505,942 A | 3/1985 | Ito et al. |
| 4,508,739 A | 4/1985 | Ryan |
| 4,513,018 A | 4/1985 | Rubio |
| 4,517,204 A | 5/1985 | Mottur et al. |
| 4,526,800 A | 7/1985 | Howard |
| 4,528,202 A | 7/1985 | Wang et al. |
| 4,537,786 A | 8/1985 | Bernard |
| 4,555,409 A | 11/1985 | Hart |
| 4,560,569 A | 12/1985 | Ivers |
| 4,567,051 A | 1/1986 | Baker et al. |
| 4,568,557 A | 2/1986 | Becker et al. |
| 4,609,557 A | 9/1986 | Mao et al. |
| 4,613,508 A | 9/1986 | Shishido |
| 4,615,901 A | 10/1986 | Yoshioka et al. |
| 4,623,548 A | 11/1986 | Willard |
| 4,623,550 A | 11/1986 | Willard |
| 4,640,843 A | 2/1987 | Matsuzak et al. |
| 4,645,679 A | 2/1987 | Lee, III et al. |
| 4,650,687 A | 3/1987 | Willard et al. |
| 4,735,811 A | 4/1988 | Skarra et al. |
| 4,749,579 A | 6/1988 | Haydock et al. |
| 4,752,493 A | 6/1988 | Moriki |
| 4,756,916 A | 7/1988 | Dreher et al. |
| 4,756,920 A | 7/1988 | Willard |
| 4,767,633 A | 8/1988 | Fowler |
| 4,769,253 A | 9/1988 | Willard |
| 4,770,891 A | 9/1988 | Willard |
| 4,778,690 A | 10/1988 | Sadel, Jr. et al. |
| 4,781,932 A | 11/1988 | Skarra et al. |
| 4,803,091 A | 2/1989 | Mottur et al. |
| 4,806,377 A | 2/1989 | Ellis et al. |
| 4,834,996 A | 5/1989 | Fazzolare et al. |
| 4,844,919 A | 7/1989 | Szwerc |
| 4,855,151 A | 8/1989 | Fielding |
| 4,859,248 A | 8/1989 | Thaler et al. |
| 4,861,609 A | 8/1989 | Willard et al. |
| 4,863,750 A | 9/1989 | Pawlak et al. |
| 4,869,911 A | 9/1989 | Keller |
| 4,873,093 A | 10/1989 | Fazzolare et al. |
| 4,876,101 A | 10/1989 | Willard |
| 4,876,102 A | 10/1989 | Feeney et al. |
| 4,879,126 A | 11/1989 | Willard et al. |
| 4,880,371 A | 11/1989 | Spinelli et al. |
| 4,889,733 A | 12/1989 | Willard et al. |
| 4,889,737 A | 12/1989 | Willard et al. |
| 4,891,233 A | 1/1990 | Belanger et al. |
| 4,910,031 A | 3/1990 | Budd et al. |
| 4,913,919 A | 4/1990 | Cornwell et al. |
| 4,917,908 A | 4/1990 | Prosise |
| 4,917,909 A | 4/1990 | Prosise |
| 4,919,965 A | 4/1990 | Childers, Jr. |
| 4,929,461 A | 5/1990 | Schonauer et al. |
| 4,931,303 A | 6/1990 | Holm et al. |
| 4,933,194 A | 6/1990 | Barry et al. |
| 4,933,199 A | 6/1990 | Neel et al. |
| 4,938,982 A | 7/1990 | Howard |
| 4,950,490 A | 8/1990 | Ghiasi et al. |
| 4,965,081 A | 10/1990 | Lazarus |
| 4,970,084 A | 11/1990 | Pirrotta et al. |
| 4,973,481 A | 11/1990 | Hunt et al. |
| 4,976,982 A | 12/1990 | Gillmore et al. |
| 4,985,262 A | 1/1991 | Camire et al. |

| | | |
|---|---|---|
| 4,994,295 A | 2/1991 | Holm et al. |
| 5,000,968 A | 3/1991 | Szwerc et al. |
| 5,030,468 A | 7/1991 | Van Lengerich et al. |
| 5,061,507 A | 10/1991 | Aulik et al. |
| D323,233 S | 1/1992 | Duffy |
| D323,234 S | 1/1992 | Duffy |
| D323,235 S | 1/1992 | Duffy |
| 5,080,914 A | 1/1992 | Birch et al. |
| 5,085,884 A | 2/1992 | Young et al. |
| 5,104,673 A | 4/1992 | Fazzolare |
| 5,110,613 A | 5/1992 | Brown et al. |
| 5,147,675 A | 9/1992 | Gage et al. |
| 5,171,600 A | 12/1992 | Young et al. |
| 5,188,859 A | 2/1993 | Lodge et al. |
| 5,194,284 A | 3/1993 | Chiu et al. |
| 5,240,731 A | 8/1993 | Bornhorst et al. |
| 5,281,432 A | 1/1994 | Zallie et al. |
| 5,283,071 A | 2/1994 | Taylor et al. |
| 5,320,858 A | 6/1994 | Fazzolare et al. |
| 5,362,505 A | 11/1994 | Hsieh et al. |
| 5,362,511 A | 11/1994 | Villagran et al. |
| 5,366,748 A | 11/1994 | Villagran et al. |
| 5,366,749 A | 11/1994 | Frazee et al. |
| D353,032 S | 12/1994 | Mistretta |
| D356,656 S | 3/1995 | Juranovic et al. |
| 5,395,637 A | 3/1995 | Reec |
| 5,405,625 A | 4/1995 | Biggs |
| 5,429,834 A | 7/1995 | Addesso et al. |
| 5,433,961 A | 7/1995 | Lanner et al. |
| 5,464,642 A | 11/1995 | Villagran et al. |
| 5,464,643 A | 11/1995 | Lodge |
| 5,470,599 A | 11/1995 | Ruhe |
| 5,500,240 A | 3/1996 | Addesso et al. |
| 5,505,978 A | 4/1996 | Roy et al. |
| 5,529,799 A | 6/1996 | Bornhorst et al. |
| 5,554,405 A | 9/1996 | Fazzolare et al. |
| 5,571,546 A | 11/1996 | Kristnus et al. |
| 5,576,033 A | 11/1996 | Herrera |
| 5,643,627 A | 7/1997 | Huang et al. |
| 5,652,010 A | 7/1997 | Gimmler et al. |
| D383,886 S | 9/1997 | Baumgartner |
| 5,690,982 A | 11/1997 | Fazzolare et al. |
| 5,695,804 A | 12/1997 | Hnat et al. |
| 5,720,822 A | 2/1998 | Jeffcoat et al. |
| 5,747,092 A | 5/1998 | Carey et al. |
| 5,902,410 A | 5/1999 | Chiu et al. |
| 5,904,947 A | 5/1999 | Jensen et al. |
| 5,922,386 A | 7/1999 | Reed et al. |
| 5,925,396 A | 7/1999 | Reed et al. |
| 5,928,701 A | 7/1999 | Jensen et al. |
| 5,964,146 A | 10/1999 | Kelly et al. |
| 5,980,967 A | 11/1999 | Carey et al. |
| D417,332 S | 12/1999 | Dawe et al. |
| 6,001,409 A | 12/1999 | Gimmler et al. |
| 6,004,612 A | 12/1999 | Andreski et al. |
| 6,022,574 A | 2/2000 | Lanner et al. |
| 6,033,707 A | 3/2000 | Lanner et al. |
| 6,056,990 A | 5/2000 | Delrue et al. |
| 6,083,541 A | 7/2000 | Hanstra et al. |
| 6,120,827 A | 9/2000 | Rocca |
| D445,237 S | 7/2001 | Boselli et al. |
| 6,277,423 B1 | 8/2001 | Orosa et al. |
| 6,479,090 B1 | 11/2002 | Carey et al. |
| 6,491,959 B1 | 12/2002 | Chiang et al. |
| 6,572,910 B2 | 6/2003 | Lanner et al. |
| 6,676,983 B2 | 1/2004 | Malfait |
| D487,951 S | 4/2004 | Barry et al. |
| D489,162 S | 5/2004 | Dings-Plooij |
| D490,590 S | 6/2004 | Ferguson et al. |
| D498,034 S | 11/2004 | Schwartzberg et al. |
| D504,001 S | 4/2005 | Ferguson et al. |
| D506,302 S | 6/2005 | Schwartzberg et al. |
| D512,198 S | 12/2005 | Schwartzberg et al. |
| D513,108 S | 12/2005 | Ferguson et al. |
| D513,652 S | 1/2006 | Schwartzberg et al. |
| D513,653 S | 1/2006 | Schwartzberg et al. |
| D515,776 S | 2/2006 | Schwartzberg et al. |
| D515,777 S | 2/2006 | Schwartzberg et al. |
| D515,778 S | 2/2006 | Ferguson et al. |
| D515,779 S | 2/2006 | Ferguson et al. |
| D515,780 S | 2/2006 | Schwartzberg et al. |
| D516,271 S | 3/2006 | Schwartzberg et al. |
| D516,272 S | 3/2006 | Ferguson et al. |
| D516,273 S | 3/2006 | Ferguson et al. |
| D516,274 S | 3/2006 | Schwartzberg et al. |
| D516,771 S | 3/2006 | Ferguson et al. |
| D516,772 S | 3/2006 | Ferguson et al. |
| D516,773 S | 3/2006 | Schwartzberg et al. |
| D516,774 S | 3/2006 | Ferguson et al. |
| D516,775 S | 3/2006 | Ferguson et al. |
| D517,274 S | 3/2006 | Schwartzberg et al. |
| D517,275 S | 3/2006 | Schwartzberg et al. |
| D517,276 S | 3/2006 | Ferguson et al. |
| D517,277 S | 3/2006 | Ferguson et al. |
| D518,272 S | 4/2006 | Schwartzberg et al. |
| D518,273 S | 4/2006 | Ferguson et al. |
| D518,621 S | 4/2006 | Ferguson et al. |
| D518,622 S | 4/2006 | Schwartzberg et al. |
| D519,713 S | 5/2006 | Ferguson et al. |
| D519,714 S | 5/2006 | Ferguson et al. |
| D520,711 S | 5/2006 | Ferguson et al. |
| D536,508 S | 2/2007 | Mihalos et al. |
| 7,210,920 B2 | 5/2007 | Kolz |
| 7,820,220 B2 | 10/2010 | Mihalos et al. |
| 2002/0018837 A1 | 2/2002 | Lanner et al. |
| 2002/0018838 A1 | 2/2002 | Zimmerman et al. |
| 2002/0022076 A1* | 2/2002 | Lanner et al. .................. 426/560 |
| 2002/0028273 A1 | 3/2002 | Teras et al. |
| 2002/0034571 A1 | 3/2002 | Zimmerman et al. |
| 2004/0067282 A1 | 4/2004 | Karwowski et al. |
| 2006/0228456 A1 | 10/2006 | Mihalos et al. |
| 2011/0008494 A1 | 1/2011 | Mihalos et al. |

FOREIGN PATENT DOCUMENTS

| | | |
|---|---|---|
| CA | 2082602 | 5/1993 |
| CA | 2223938 | 3/1997 |
| CA | 2174824 | 10/1998 |
| CA | 2289489 | 11/1998 |
| CA | 2175452 | 1/1999 |
| CA | 2181123 | 1/2000 |
| CA | 2197179 | 4/2001 |
| CA | 2 406 971 | 12/2001 |
| DE | 26 04 716 A1 | 8/1976 |
| DE | 41 37 161 A1 | 5/1993 |
| EP | 0 184 964 A2 | 6/1986 |
| EP | 0 482 709 A1 | 4/1992 |
| EP | 0 841 012 A1 | 5/1998 |
| FR | 2 267 049 | 11/1975 |
| GB | 107218 | 6/1917 |
| GB | 1 525 631 | 9/1978 |
| GB | 2 111 816 A | 7/1983 |
| GB | 2 114 416 A | 8/1983 |
| JP | 54-1786 | 1/1979 |
| JP | 54-32056 | 10/1979 |
| JP | 55-108250 | 8/1980 |
| JP | 59-31642 | 2/1984 |
| JP | 60-168361 | 8/1985 |
| JP | 60-244256 | 12/1985 |
| JP | 61-202658 | 9/1986 |
| SU | 370933 | 11/1973 |
| WO | 95/05742 | 3/1995 |
| WO | 95/05744 | 3/1995 |
| WO | 96/01572 | 1/1996 |
| WO | 97/25880 | 7/1997 |
| WO | 99/33357 | 7/1999 |
| WO | 99/34691 | 7/1999 |
| WO | 01/37672 A1 | 5/2001 |

OTHER PUBLICATIONS

Tressler, Donald K. Ph.D., *Food Products Formulary*, vol. 2, Cereals, Baked Goods, Dairy and Egg Products, The AVI Publ. Co., Westport, CT., pp. 103-104 (1975).

"Low-Calorie, Baked Snack . . . 'Potato Pips'", *Engineered Foods Magazine*, p. 58 (Aug. 8, 1984).

Pyler, E.J., "Baking Science and Technology", Siebel Publ. Co., Chicago, IL, 1973, pp. 428-429.

Matz, S.A., *Cookie and Cracker Technology*, The AVI Publ. Co., Chapter 18, pp. 238-253 (1968).
Matz, S.A., *Cookie and Cracker Technology*, The AVI Publ. Co., pp. 265-266 (1968).
Pyler, E.J., *Baking Science & Technology*, Sosland Publishing Co., Merriam, KS, 1988, pp. 1061-1062, 913, and 609.
*Foods and Food Preparation Encyclopedia*, Van Nostrand Reinhold Co., Inc., NY, NY, 1982, pp. 282-284.
Desrosier, N.W., *Elements of Food Technology*, AVI Publ. Co., Inc., Westport, Conn., 1977, pp. 479-482 and 468-469.
Cerletti, et al., "Maize Germ Proteins, Their Composition, Nutritive Value and Functional Properties", *Proc. Int. Assoc. Cereal Chem. Symp. Amino Acid Composition and Biological Value of Cereal Proteins*, Budapest, Hungary 1983, R. Lasztity, M. Hidvegi, eds.
Encyclopedia of Food Technology, vol. 2, pp. 262-267, (1974), The AVI Publishing Company, Inc.
Kotschevar, L.H., *Standards, Principals, and Techniques in Quality Food Production*, Van Nostrad Reinhold, NY, NY, 1988, pp. 404-407.
Whistler, et al., *Starch: Chemistry and Technology*, Academic Press, Inc., pp. 588-590 (1984).
"Methods in Carbohydrate Chemistry," Academic Press, 1964, vol. IV, pp. 168-169.
Matz, *Cookie and Cracker Technology*, 2nd ed., The AVI Publ. Co., Inc. (1968), pp. 11-12.
Atwell, et al., "*The Terminology and Methodology Associated With Basic Starch Phenomena*", *Cereal Food World*, vol. 33, No. 3, pp. 306-311 (Mar. 1988).
Whistler et al., *Starch: Chemistry & Technology*, Academic Press, Inc., pp. 25, 30, 49-59 (1984).
Specifications for Baker's Bran, 10691, DOC, The Pillsbury Co., Sep. 29, 1999.
Flav-R-Grain® Fine Product Data, Quali Tech, Inc. (Oct. 1995).
Regular #O Yellow Product Data, Azteca Milling Co. (Jan. 1996).
PGF 1000 Pregelatinized Corn Flour, Lauhoff Grain Co. (Jul. 1997).
Pizzarias Pizza Chips, Pizza Supreme, sample of packaging including list of ingredients from trademark appln. No. 74/080,043, Jan. 1991 (first use in commerce), Keebler Company, Elmhurst, IL.
Pizzarias Pizza Chips, Zesty Pepperoni, sample of packaging including list of ingredients from trademark appln. No. 74/080,043, Jan. 1991 (first use in commerce), Keebler Company, Elmhurst, IL.
Zings Snack Chips, sample of packaging including list of ingredients, May 1991 (first use in commerce), Nabisco, Inc., East Hanover, NJ, from file wrapper of U.S. Appl. No. 74/122,575.
Zings Snack Chips, color reproduction of packaging, including list of ingredients, 1991 (use in commerce), Nabisco, Inc., East Hanover, NJ.
Zings Ranch Cracker Chips, color reproduction of packaging including list of ingredients, 1991 (use in commerce), Nabisco, Inc., East Hanover, NJ.
Zings Cheddar Snack Chips, 1991 (use in commerce), Nabisco, Inc., East Hanover, NJ.
Munch'ems Seasoned Original, sample of packaging, including list of ingredients from trademark appln. No. 74/088,762, Jan. 1991 (first use in commerce), Keebler Company, Elmhurst, IL.
Munch'ems Southwest Salsa, sample of packaging including list of ingredients, Keebler Co. 1996 (copyright date).
Munch'ems Crackers, list of ingredients obtained from Keebler Company web site (possible use in commerce 1991).
Munch'ems Sour Cream & Onions Crackers, list of ingredients obtained from Keebler Company web site (possible use in commerce 1991).
Munch'ems Southwest Salsa Crackers, list of ingredients obtained from Keebler Company web site (possible use in commerce 1996).
Munch'ems Ranch Crackers, list of ingredients obtained from Keebler Company web site (possible use in commerce 1996).
Munch'ems Cheddar Crackers, list of ingredients obtained from Keebler Company web site (possible use in commerce 1991).
Munch'ems Reduced Fat Sour Cream and Onion Crackers, list of ingredients obtained from Keebler Company web site (possible use in commerce 1996).
Cheese Nips Reduced Fat Cheddar, sample of packaging, including list of ingredients, Kraft Foods North America.
Big Cheese Nips, sample of packaging, including list of ingredients, Kraft Foods North America.
Canadian Office Action dated Mar. 29, 2011 that issued with respect to patent family member Canadian Patent Application No. 2,436,819.

* cited by examiner

PRODUCTION OF THIN, IRREGULAR CHIPS WITH SCALLOPED EDGES AND SURFACE BUBBLES

RELATED APPLICATIONS

This application is a division of U.S. application Ser. No. 10/371,547, filed Feb. 21, 2003, which claims priority of provisional application U.S. Ser. No. 60/402,304, filed Aug. 9, 2002, the disclosures of which are incorporated by reference herein in their entireties.

FIELD OF THE INVENTION

The present invention relates to the production of thin, baked snacks having an irregular shape, scalloped edges, a chip-like crispy texture and surface bubbles. The present invention also relates to an apparatus for producing the snacks.

BACKGROUND OF THE INVENTION

In the production of baked snacks from a dough, such as a wheat-based dough, generally the thinner the dough the more chip-like is the baked snack in crispness and appearance. Also, the more irregular the shape of the snack, and the greater the variety of shapes, the greater is the impression of a chip-like appearance rather than a cracker appearance. Cohesive, machinable doughs which can be sheeted, stretched, and cut into pieces may be produced at room temperature when the doughs possess a high content of wheat or other gluten-containing flour. The baking of conventional wheat-based doughs into crackers provides a lamellar structure with generally uniform small cells and a tender, mealy, leavened texture. Upon mastication, the conventional crackers generally disperse more rapidly than does a chip. They do not provide a crunchy texture and a sensation of breaking into pieces with low molar compaction before dispersion as does a chip. Additionally, crackers are generally dockered to prevent pillowing and to provide a generally flat bottom surface and a blistered top surface. Oyster or soup crackers and snack crackers which have a pillowed appearance may be produced from wheat-based doughs by the elimination of dockering holes. However, these products still possess a leavened, tender, mealy texture and a cracker appearance, rather than a crisp, crunchy chip-like texture and chip-like appearance.

Filled baked crackers or snacks obtained by needle injection of fillings into hollow expanded snacks made from wheat flour are disclosed in U.S. Pat. No. 4,209,536 to Dogliotti, U.S. Pat. No. 4,613,508 to Shishido, U.S. Pat. No. 4,752,493 to Moriki, and U.S. Pat. No. 5,000,968 to Szwerc et al. Production of a chip-like snack having surface bubbles and surrounding crisp, thin regions is not disclosed in these patents. The doughs are formulated and processed to retain a puffed or pillowed shape after piercing of the baked, hollow piece.

A cellular structure is obtained by the use of egg white in the shell of the pastry product of U.S. Pat. No. 4,209,536 to Dogliotti.

In the process of U.S. Pat. No. 4,613,508 to Shishido, hard dough biscuits are prepared by baking a dough having 10-30 parts by weight of sugar, 10-25 parts by weight of edible fat or oil, 1.5-4.0% leavening agent, and 20-35 parts by weight of water per 100 parts by weight of cereal flour to obtain a degree of leavening of at least 280%.

The baked hollow expanded snacks in the form of a figure such as an animal or vehicle of U.S. Pat. No. 4,752,493 to Moriki are produced from a farinaceous raw mixture. The raw mixture is prepared by mixing from 60-95 parts by weight of at least one low swelling-capacity farinaceous material and 40-5 parts by weight of at least one high swelling-capacity farinaceous material. The low swelling-capacity material may be a non-glutinous cereal such as wheat, rye, maize, non-glutinous rice, sago, sorghum, triticale, millet and beans, or starches separated from these sources. The high swelling-capacity material may be potato, taro, tapioca, arrowroot, sweet potato, glutinous rice, waxy corn, or starches derived from these sources having their cell walls broken. The farinaceous raw mixture is partly gelatinized prior to rolling into a smooth sheet by the addition of hot water or by the action of steam, so as to raise the temperature of the farinaceous raw mixture to 65° C. to 90° C. According to Moriki, upon baking, the starch in the surface of the dough pieces is gelatinized, thereby forming a skin having good gas-holding capacity and excellent stretchability. Water and volatile materials in the dough pieces push the skin outward upon heating, so that the dough pieces expand and are internally split into two layers or shells, forming a hollow space therebetween.

The filled crackers of U.S. Pat. No. 5,000,968 to Szwerc et al. are produced from a dough containing proteolytic enzymes. The enzymes hydrolyze proteins of the flour, which relaxes the dough and thereby permits a hollow center to be formed, rather than a cellular center, as the cracker expands under the influence of the leavening agent during baking. This, it is disclosed, strengthens the shell of the cracker and permits the cracker to be filled by means of an injection needle piercing the surface of the cracker.

The production of chip-like, starch-based snacks having a crispy texture and surface blisters from starch-based compositions which have little or no gluten, such as potato flour or corn flour, is disclosed in U.S. Pat. Nos. 4,873,093 and 4,834, 996 to Fazzolare et al. and U.S. Pat. Nos. 5,429,834 and 5,500,240 to Addesso et al. Starch-based compositions which have little or no gluten, when mixed with water, do not form a dough that is cohesive at room temperature and continuously machinable or sheetable. Machinability of doughs made from ingredients having little or no gluten may be improved by forming a dough under elevated temperature conditions, such as by steaming the ingredients, as disclosed in U.S. Pat. Nos. 4,873,093 and 4,834,996 to Fazzolare et al.

In the process of U.S. Pat. Nos. 5,429,834 and 5,500,240 to Addesso et al., use of a pregelatinized waxy starch provides for the production of cohesive, extensible, continuously machinable doughs from starchy materials or ingredients having starch with no or low gluten. These machinable doughs may be formed at room temperatures without the need for steaming or heat treatment to develop cohesiveness, extensibility, and machinability.

U.S. Pat. Nos. 4,931,303 and 4,994,295 to Holm et al. disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch), and the concentration of any starch-complexing emulsifiers present. In the Holm et al. process, a dough may be formed comprising, e.g., potato solids or corn solids, raw or pregelatinized starches, modified starches, flavorings, oils, and the like. For producing potato snacks, the preferred major ingredient in the potato dough is a dehydrated potato flake with high water-absorption capability. The dry ingredients are placed in a mixer and blended with water to obtain a dough having a moisture content of from about 30% to about 55%. According to Holm et al., higher moisture content means higher oil absorption during frying. It is further disclosed that doughs containing less than about 30% moisture are generally too dry, after the Holm et al. drying step, to create adequate bubbles. In the Holm et al. process, substantial moisture reduction of the dough is achieved by frying. During frying, the dough moisture content of about 30% to about 55% is reduced to obtain a fried product with a moisture content of about 1-2%.

U.S. Pat. No. 4,560,569 to Ivers discloses that in the production of a dough-based fried food product, a processed starch in either gelatinized or ungelatinized form is frequently added when a low-starch flour or flake is employed. Water, it is disclosed, is required to soften the flour, and depending upon the protein content of the flour, to form a network of protein (gluten), which is the framework of the product. According to Ivers, starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during flying, without the rapid buildup of free fatty acids and without significant darkening of frying oil, normally associated with the frying of foods containing lecithin.

U.S. Pat. Nos. 5,747,092 and 5,980,967 each to Carey et al. disclose that in the production of wheat-based baked snacks the inclusion of a pregelatinized starch in the dough to create surface bubbles tends to result in a styrofoam-like or compressible texture, rather than a highly crisp, crunchy texture. Also, if the pregelatinized starch is not sufficiently hydrated prior to baking, bubbles created during baking tend to collapse. A pregelatinized potato starch, which is also activated (i.e. sufficiently hydrated) prior to baking, is employed to reduce or control bubbling and to avoid a styrofoam-like texture. Sufficient hydration of the pregelatinized waxy starch and pregelatinized potato starch is achieved by premixing them with hot water or by providing sufficient dough lay time for hydration to occur. The Carey et al. patents disclose forming a dough-like composition into a sheet, and compressing the dough sheet to reduce its thickness. The dough sheet may first be reduced in thickness to about ½ inch and then to about ¼ inch. The reductions in thickness may be performed by the use of one or more sets of counterrotating reduction rolls. In either case, a final reduction in thickness is done by a gauge roller. The dough may be reduced during this operation to a final thickness of about 1/32 of an inch. The dough sheet may then be cut to a desired configuration, such as square, round, or rectangular shaped or potato slice shaped. The dough piece, it is disclosed may be cut to provide a scalloped edge or periphery.

U.S. Patent Publications US 2002/0022076 A1 to Lanner at al., US 2002/0018837 A1 to Lanner et al., US 2002/0018838 to Zimmerman et al., US 2002/0034571 A1 Zimmerman et al., and US 2002/0028273 to Teras et al. disclose a process for making a bubbled snack chip. The chips are made from a dough composition comprising a pre-cooked, starch-based material (masa) and a pregelatinized starch. The pre-cooked, starch-based material has a pasting temperature from about 140° F. to about 209° F.; a peak viscosity of about 200 cP to about 1500 cP; a final viscosity of from about 500 cP to about 2200 cP; and a water absorption index of from about 2 to about 4. The pre-cooked, starch-based material has a particle size distribution in which about 0 to about 15 wt. %, preferably about 2 to about 15 wt. %, remain on a #16 U.S. sieve. The pre-cooked starch-based material may consist essentially of corn that has been cooked and steeped in a lime-water solution.

U.S. Pat. No. 6,004,612 to Andreski et al. discloses the production of shredded snacks with a chip-like appearance and texture. Thin, crisp, baked snacks having a chip-like appearance are continuously produced from a cooked, shredded laminate by substantially compressing the laminate without deleteriously affecting the attainment of a substantially uniform, visually apparent shred or woven pattern in the final, baked product. Additionally, at least substantially all, or all of the individual shred layers maintain their integrity and may be viewed in the final, baked product. The substantial compression is achieved by supporting the laminate of cooked, net-like sheets on a conveyer belt, and passing the supported laminate and belt between at least one pair of counterrotating compression rolls. The bottom, belt-supporting compression roll helps to maintain the linear speed of the separately driven conveyer belt as the top roll compresses the laminate against the top surface of the belt. Substantial movement or slippage of the laminate relative to the belt which would substantially disrupt or distort the shred pattern of the laminate is avoided. Air voids and inter-layer spacing are substantially reduced and interlayer adhesion is substantially increased by the compression so that upon baking the compressed laminate separation of the layers and puffing is substantially eliminated. The substantial compression of the laminate provides a thin, flat, chip-like appearance rather than a puffed or thick biscuit or cracker appearance. Upon completion of the compression, the thickness of the compressed laminate may range from about 0.035 inch to about 0.065 inch, preferably from about 0.055 inch to about 0.062 inch. The compressed laminate is preferably partially cut into triangular shaped pieces having flattened, blunted or rounded corners by a rotary cutter so that the apex or point of a triangle in one row does not touch or intersect the apex or point of another triangle located in an adjacent row.

It has been found that compression of doughs which are bakeable to a chip-like appearance results in tearing or shredding of the dough sheet when the dough sheet is compressed by final gauge rolls to a thickness of less than or equal to about 0.035 inch. Also, as production rates are increased and dough sheet thickness decreases, tearing of the dough sheet increases.

In the present invention, thin, baked snacks having an irregular shape, scalloped edges, a chip-like crispy texture and bubbles distributed over their surfaces are produced from a dough sheet which has been subjected to compression in final gauge rolls to a thickness of less than or equal to about 0.035 inch. The thin dough sheets may be produced continuously without tearing, shredding, or sticking at the final gauge rolls even at high production rates or line speeds. The irregularly shaped snack in a variety of shapes, can be produced from a single dough sheet by continuously cutting the thin dough sheet into pieces with a rotary cutter without producing dough scraps between the pieces. The very thin, irregularly shaped baked products provide an enhanced crispy, crunchy, chip-like texture and appearance rather than a cracker appearance and texture. The thin dough sheet may be cut to provide sufficiently large scalloped edges which are distinctly visible even after baking.

SUMMARY OF THE INVENTION

A dough sheet for producing thin, baked chips is obtained continuously by compressing a dough sheet to a thickness of less than or equal to about 0.035 inch between counter-rotating gauge rolls while maintaining the surface of each gauge roll at a temperature of about 85° F. to about 95° F. Maintaining the gauge roll surface temperature at about 85° F. to about 95° F. avoids sticking, tearing, and shredding of the thin dough sheet as it is compressed and transferred by the gauge rolls, even at high production rates or line speeds. In embodiments of the invention, the nip or gap between the counterrotating gauge rolls may be set to less than or equal to about 0.035 inch, preferably less than or equal to 0.030 inch, more preferably less than or equal to 0.025 inch, and most preferably less than or equal to 0.022 inch, while achieving high production rates without tearing of the dough sheet.

The present invention also provides an apparatus for continuously producing thin, irregularly shaped, scallop-edged snacks in a variety of shapes from a single dough sheet without producing dough scraps between the pieces. The apparatus includes a pair of jacketed, temperature controlled, counterrotating gauge rolls for producing a thin dough sheet, wherein the nip or gap between the counterrotating gauge rolls is set to less than or equal to about 0.035 inches, and a rotary cutter. The rotary cutter has a plurality of rows of blunt-edged or rounded cutting elements which extend circumferentially around the rotary cutter. Each adjacent cutting element within each row produces a differently shaped dough piece. Also, adjacent cutting elements within adjacent rows produce a differently shaped dough piece. One or more sides of each dough piece and baked product may each be convex or concave in shape, or may each have a concave portion and a convex portion.

The baked snack chips of the present invention include at least one flour, such as wheat flour, and a pregelatinized waxy maize starch. A pregelatinized waxy starch provides an extensible surface film prior to baking, which helps to temporarily trap moisture below the expandable film surface upon baking and promotes the production of surface bubbles. A pregelatinized potato starch, which is also activated (i.e. sufficiently hydrated) prior to baking, helps to reduce or control bubbling and to avoid a styrofoam-like texture. The snack chips of the present invention are baked from a dough piece having a thickness of preferably less than or equal to about 0.035 inch. The very thin, irregularly shaped baked products provide an enhanced crispy, crunchy chip-like texture and appearance rather than a cracker appearance and texture. Even though the dough is very thin, the dough sheet may be cut to provide sufficiently large scallops around the entire periphery of each dough piece so that the scallops are distinctly, visibly apparent in the baked snack. The baked chips have surface bubbles comprising air pockets extending both above and below substantially unleavened, adjacent portions of the snack. Dockering or piercing of the dough prior to baking results in localized unleavened or thinned areas and does not prevent the attainment of a plurality of discrete bubbles. The pieces may also include blisters interspersed with the bubbles.

BRIEF DESCRIPTION OF THE DRAWINGS

The present invention is further illustrated by the accompanying drawings wherein.

DETAILED DESCRIPTION OF THE INVENTION

Thin, baked snack chips having a crispy texture, an irregular shape, scalloped edges or sides, and surface bubbles such as shown in FIGS. 1-18, are continuously produced by forming a dough into a dough sheet, reducing the thickness of the dough sheet using a pair of counterrotating gauge rolls where the nip or gap between the counterrotating gauge rolls is less than or equal to about 0.035 inches, preferably less than or equal to 0.030 inches, more preferably less than 0.025 inches, most preferably less than or equal to 0.022 inch, for example from about 0.012 inch to 0.022 inch. Use of these very thin gaps provides a highly desirable thin appearance and crisp texture in the final baked product.

However, to continuously produce a wheat-based dough sheet using a final gauge roll gap of less than or equal to about 0.035 inches at high production rates or line rates, the surface of each of the gauge rolls must be maintained at a temperature of about 85° F. to about 95° F. Generally, maintaining the surface of the gauge roll at a given temperature also maintains the dough sheet temperature within about 1° F. to about 3° F. of the gauge roll surface temperature. Use of a gauge roll surface temperature of about 85° F. to about 95° F. avoids sticking, tearing, or shredding of the dough sheet as it undergoes conveyance through and compression in the gauge rolls and assures the attainment of a consistent dough sheet thickness. Use of gauge roll surface temperatures outside of this range has been found to result in sticking of the dough sheet to the final gauge rolls which results in excessive tearing or shredding of the dough sheet with loss of production time and dough wastage. It is believed that as a dough sheet is reduced in thickness, not only does it tend to become more fragile, but also the film formed on its surface from film forming components such as a pregelatinized waxy starch exerts a greater influence on dough rheology, flexibility, water retention, and adhesiveness. Maintaining the gauge roll surface at a given temperature within the above range also maintains the dough sheet at a temperature which helps to provide or maintain proper dough viscosity, flexibility, strength, cohesiveness, moisture content, and reduced stickiness so as to achieve consistent release of the dough sheet from the gauge roll surface.

In accordance with the present invention production rates or line rates of from about 25 feet per minute (fpm) up to about 130 feet per minute (fpm), preferably from about 95 fpm to about 120 fpm may be achieved continuously without tearing or shredding of the dough. In embodiments of the invention, rotary cutter speeds of from about 25 fpm to about 130 fpm, preferably from about 95 from to about 120 fpm may be employed.

Generally, when the dough employed in the present invention is reduced in thickness by compression in the nip or gap between counterrotating gauge rolls, the compressed dough sheet may spring back or expand by up to about 35% of the original compressed dough sheet thickness or nip or gap setting. For example, when the final gauge roll gap or nip is set at 0.034 inch, 0.030 inch, 0.022 inch, or 0.017 inch the dough sheet is compressed to and has a thickness within the gap or nip of 0.034 inch, 0.030 inch, 0.022 inch, or 0.017 inch, respectively. However, upon or shortly after exiting the nip or gap, the dough sheet thickness may expand or increase to 0.042 inch, 0.037 inch, 0.029 inch, or 0.020 inch, respectively. In embodiments of the present invention dough sheet thicknesses up to about 0.040 inch after expansion from the final gauge roll nip of 0.030 inch may be employed and subjected to rotary cutting to obtain thin snack chips in accordance with the present invention. In preferred embodiments, the nip or gap of the final gauge roll is set at less than 0.025 inch, preferably less than or equal to 0.22 inch so as to obtain a dough sheet thickness after springback or expansion which is less than or equal to 0.030 inch. Thus, in preferred embodiments, the dough sheet which is subjected to rotary cutting has a consistent thickness across its width and length of less than 0.030 inch.

Generally, the greater the amount of compression of a dough entering the nip of the final gauge rolls, the greater is the amount of spring back or expansion after it leaves the nip. In preferred embodiments of the present invention, the dough sheet thickness is gradually reduced prior to entering the final gauge rolls using one or more pairs of counterrotating auxiliary gauge rolls or compression rolls. In embodiments of the invention, the dough sheet produced in the dough sheeter may be reduced in thickness by each set of auxiliary gauge rolls and by the final gauge rolls up to about 70%, generally at least about 10% of the thickness of the dough sheet entering the set of gauge rolls. For example, the dough sheet entering a first set of auxiliary rolls may have its thickness reduced by about 10% to 20%. Then the dough sheet entering a second set of auxiliary rolls may have its thickness reduced by about 45% to about 65%. The compressed dough sheet entering the final gauge rolls may then have its thickness reduced by about 35% to about 60%.

The auxiliary gauge roll and the rotary cutter may be operated under ambient conditions. The surface temperature of the auxiliary gauge rollers do not have to be adjusted or maintained to prevent sticking or tearing of the dough sheets passing through them. The temperature of the surface of the final gauge rolls may be controlled and maintained within the range of 85° F. to 95° F. by using a conventional fluid heat transfer medium such as water or food grade propylene glycol to internally either heat or cool the gauge rolls. Whether the gauge rolls are heated and/or cooled to maintain a desired temperature may depend upon ambient conditions, dough lay times, and line speeds or production rates. Generally, heating is employed at low production rates or line speeds and low ambient temperature conditions and long lay times. Cooling is generally employed at high production rates or line speeds, high ambient temperature conditions, and short lay times.

Conventional, commercially available jacketed final gauge rolls, and temperature monitoring and control equipment may be employed in the present invention. Likewise, conventional, commercially available auxiliary gauge rolls or compression rolls may be utilized in the present invention along with conventional three or four roll dough sheeters. A four roll dough sheeter is preferred. Conventional conveyors may be employed for feeding the dough sheets directly to the nip or gap of each pair of auxiliary rolls and the pair of final gauge rolls. Separate conveyors, downstream of each set of auxiliary rolls and downstream of the final gauge rolls may be employed to receive the compressed dough from the nip of each pair of rolls in conventional manner.

The thin dough sheet from the final gauge rolls may be continuously cut using a rotary cutter to produce an array of dough pieces which are irregularly-shaped and scallop-edged. The dough pieces are produced in a variety of shapes from a single dough sheet without producing dough scraps between the pieces. Even though the dough is very thin, the dough sheet may be cut to provide sufficiently large scallops around the entire periphery of each dough piece so that the scallops are distinctly and visibly apparent in the baked snack as shown in FIGS. 1-18.

Figure 1:
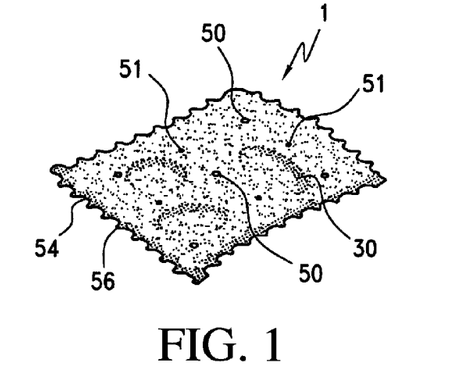
FIGS. 1 through 18 are top perspective views of eighteen differently shaped, irregular snacks of the present invention which may be produced from a single, thin dough sheet in accordance with the present invention.
Figure 2:
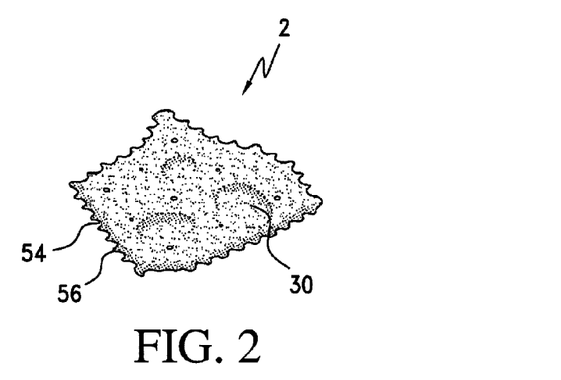
Figure 3:
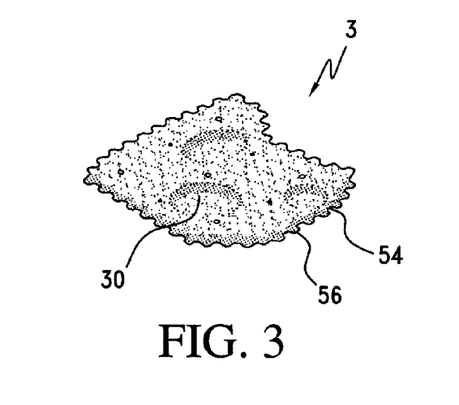
Figure 4:
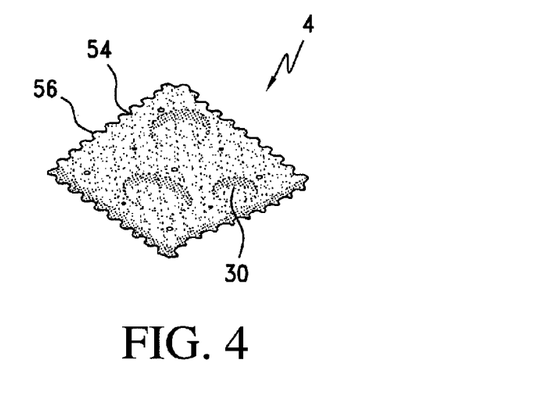
Figure 5:
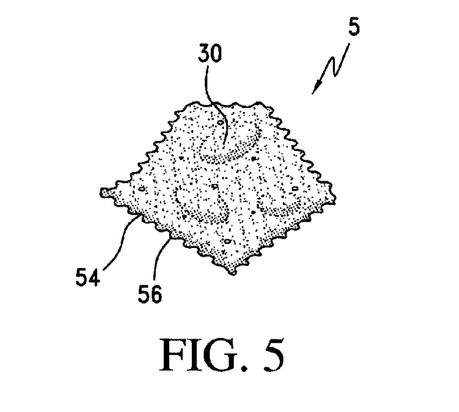
Figure 6:
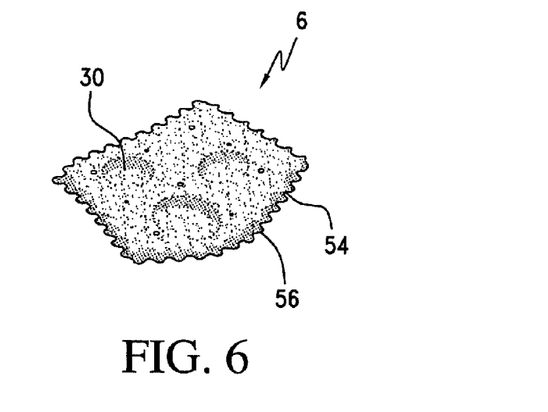
Figure 7:
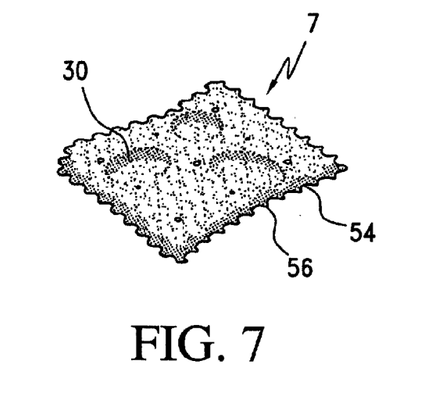
Figure 8:
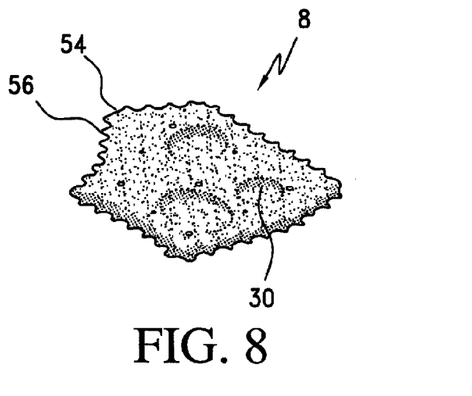
Figure 9:
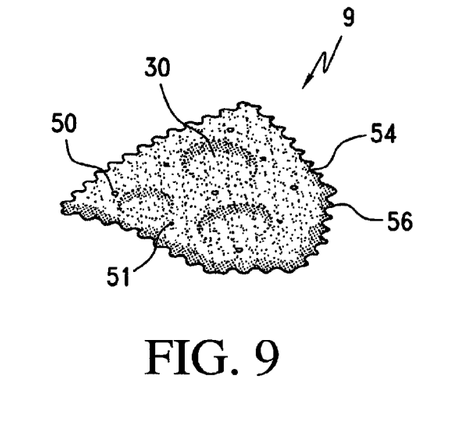
Figure 10:
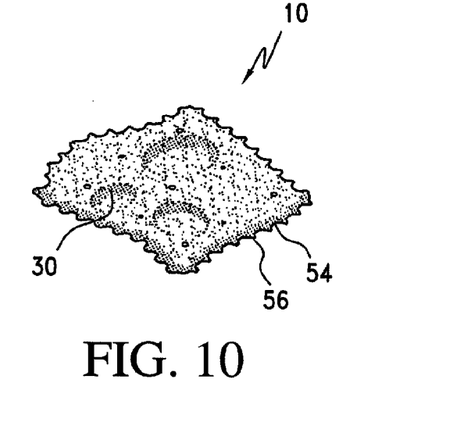
Figure 11:
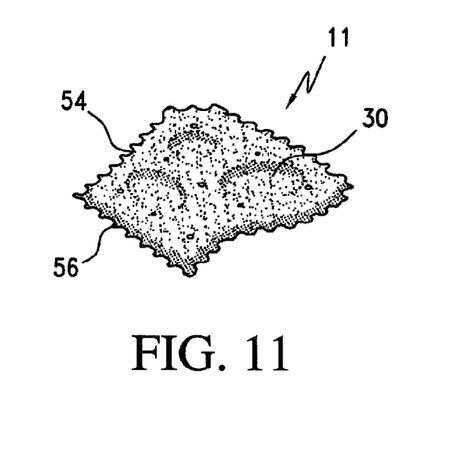
Figure 12:
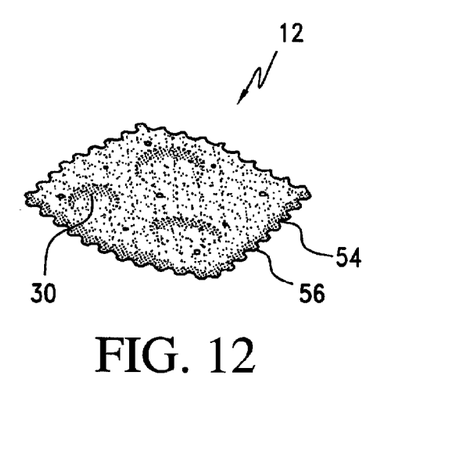
Figure 13:
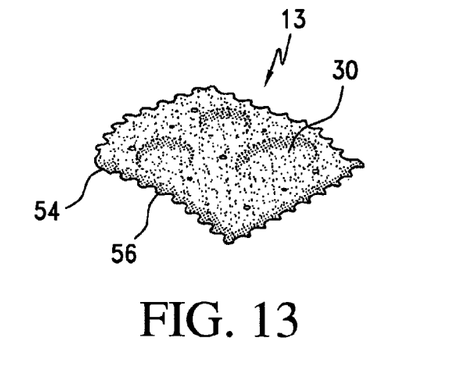
Figure 14:
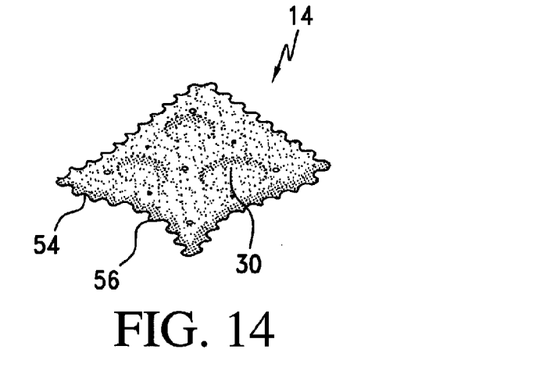
Figure 15:
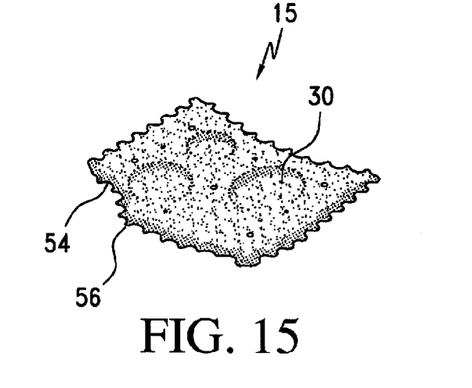
Figure 16:
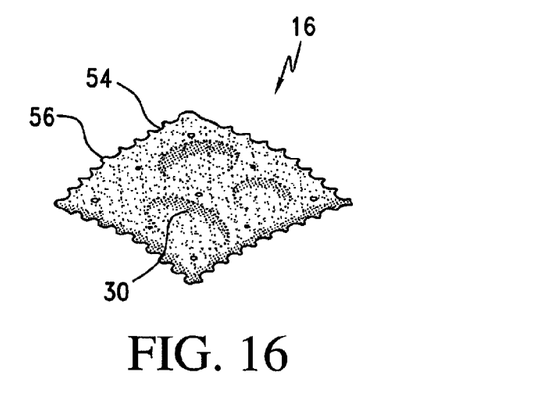
Figure 17:
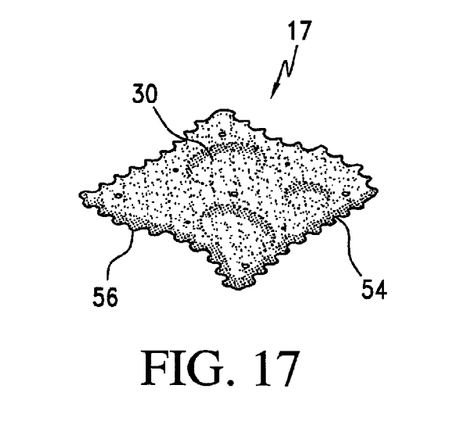
Figure 18:
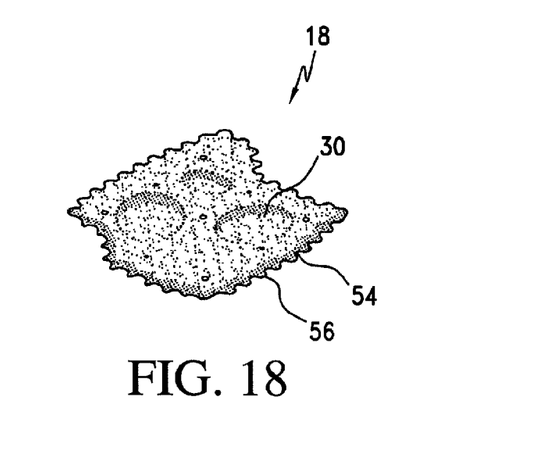

As shown in FIGS. 1-18, the thin, baked snacks of the present invention made from a single dough sheet may have an irregular shape, each of which is different in FIGS. 1-18. Each differently shaped snack may include docker holes, and scalloped edges or sides around its entire periphery. For each of the different shapes, at least one of the edges or sides may be concave or convex in shape. In embodiments of the invention, one or more sides of a snack may have both a convex portion and a concave portion. In embodiments of the invention, the snack chips may have five or more sides or edges, for example, as shown in FIGS. 5 and 8.

Figure 19:
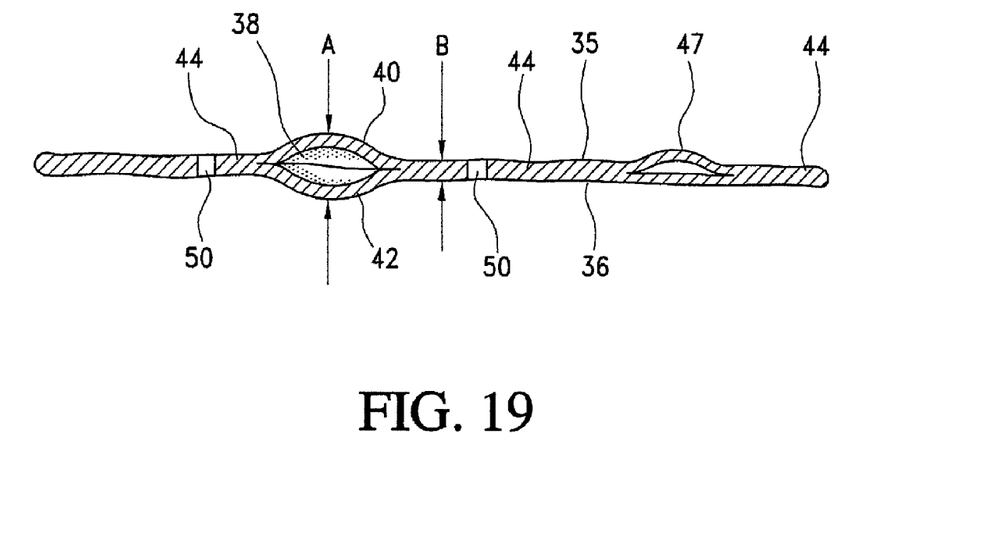
FIG. 19 is a cross-sectional view of a snack product of the present invention showing a cross-section of a bubble and a blister.

The baked snacks of the present invention include non-fermented and fermented reduced fat, low-fat, and no-fat baked products, as well as full-fatted non-fermented and fermented baked products. They may have the taste or flavor of a wheat-based cracker, but the crispy, crunchy texture of a chip, rather than a leavened, mealy texture. As shown in FIGS. 1-19, the snack chips 1-18 have surface bubbles 30 distributed over their top and bottom surfaces 35, 36. As shown in FIG. 19, the bubbles 30 provide air pockets 38 within thinned, concave downwardly curved upper walls 40 and thinned, concave upwardly curved lower walls 42. The bubbles 30 and the air pockets 38 each extend a substantial distance both above and below adjacent, generally flat, crispy, substantially unleavened, thin areas 44 of the baked pieces 1-18, as shown in FIGS. 1-19.

The vertical dimensions of the bubbles 30 and of the air pockets 38 are substantially greater than the vertical dimensions of surrounding, adjacent, substantially flat areas 44 of the snack pieces 1-18. In embodiments of the invention, the ratio of the maximum vertical distance A between the upper surface and lower surface of at least two bubbles 30 per piece 1-18 to the maximum thickness B of the adjacent, generally flat, crispy, unbubbled and non-blistered areas 44 is at least about 2:1, preferably at least about 2.5:1, most preferably at least about 2.75:1. The pieces 1-18 may also include one or more blisters 47 interspersed with the bubbles 30, as shown in FIG. 19. The blisters 47 extend from only one surface, such as top surface 35, of the pieces 1-18, whereas the bubbles 30 extend from opposing surfaces 35 and 36 of the pieces 1-18.

In preferred embodiments, the snacks 1-18 are provided with a plurality of docker holes to reduce checking and to help to avoid pillowing or the creation of an entirely puffed surface. The snacks may have a plurality of docker holes 50 and a plurality of smaller docker holes 51 that alternate on each snack. Thus, each snack has a less cracker-like appearance than a snack with a plurality of large docker holes. In preferred embodiments, each snack may have about nine docker holes. A plurality of discrete bubbles 30 may be obtained, even though the sheeted doughs of the present invention are dockered or pierced prior to baking. The peripheral edge 54 of the snacks 1-18 may include scalloping or nicks 56 which extend around the entire periphery of the snack pieces, as shown in FIGS. 1-18.

Figure 20:
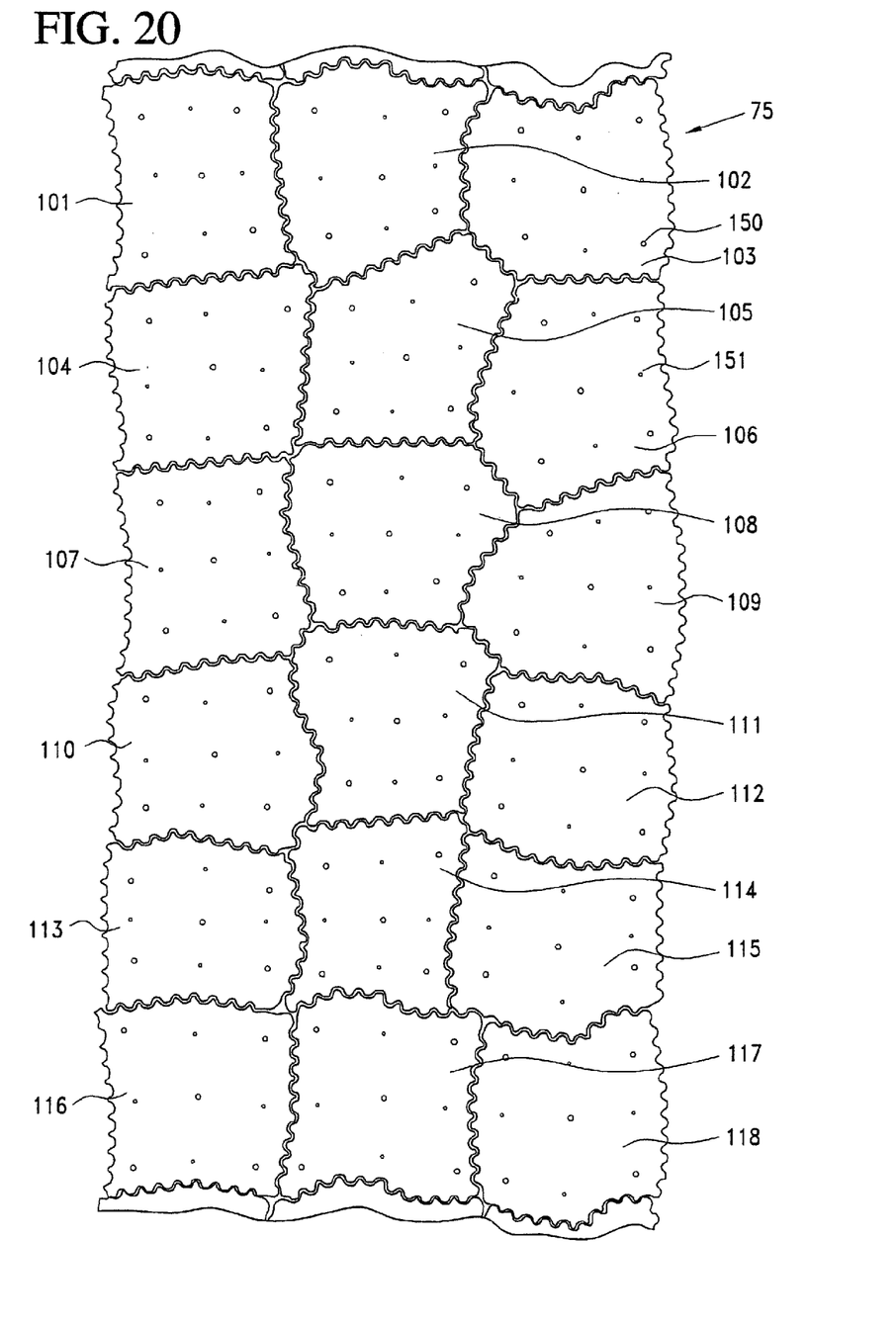
FIG. 20 shows a section of a rotary cutter design having cutting edges which may be used to produce the eighteen differently shaped snacks of FIGS. 1-18 from a single dough sheet without producing interstitial dough scrap between adjacent dough pieces.

A rotary cutter 75 which may be used to produce the eighteen differently shaped, irregularly shaped snacks chips shown in FIGS. 1-18 is partially shown in FIG. 20. Dough pieces in an array which may be baked to obtain snack chips 1-18 of FIGS. 1-18, respectively, may be produced from cutting sections or elements 101-118, respectively shown in FIG. 20. The rotary cutter 75 has a plurality of rows of blunt-edged or rounded cutting elements 101-118 which extend circumferentially around the rotary cutter 75. Each adjacent cutting element 101-118 within each row produces a differently shaped dough piece. Also, adjacent cutting elements 101-118 within adjacent rows produce a differently shaped dough piece. One or more sides of each cutting element 101-118, and corresponding dough piece and baked product 1-18, may each be convex or concave in shape, or may each have a concave portion and a convex portion. Each cutting element may have four, five, or more edges or sides. Each cutting element 101-118 contains a plurality of large docker pins 150 and small docker pins 151 in alternating arrangement for producing alternating large and small docker holes 50, 51 in each snack chip.

The blunt cutting elements 101-118 cut all the way through the dough and very slightly separate the pieces from each other so that the dough pieces do not rejoin or stick together after being cut. After being cut, the dough pieces may be separated in the downstream direction by transferring the dough pieces to a downstream conveyor which is operated at a slightly faster speed than the conveyer upon which the dough sheet is cut. The dough pieces produced by the rotary cutter 75 may preferably have at least substantially the same piece weight, so as to provide more even baking of each piece across the oven band.

Figure 21:
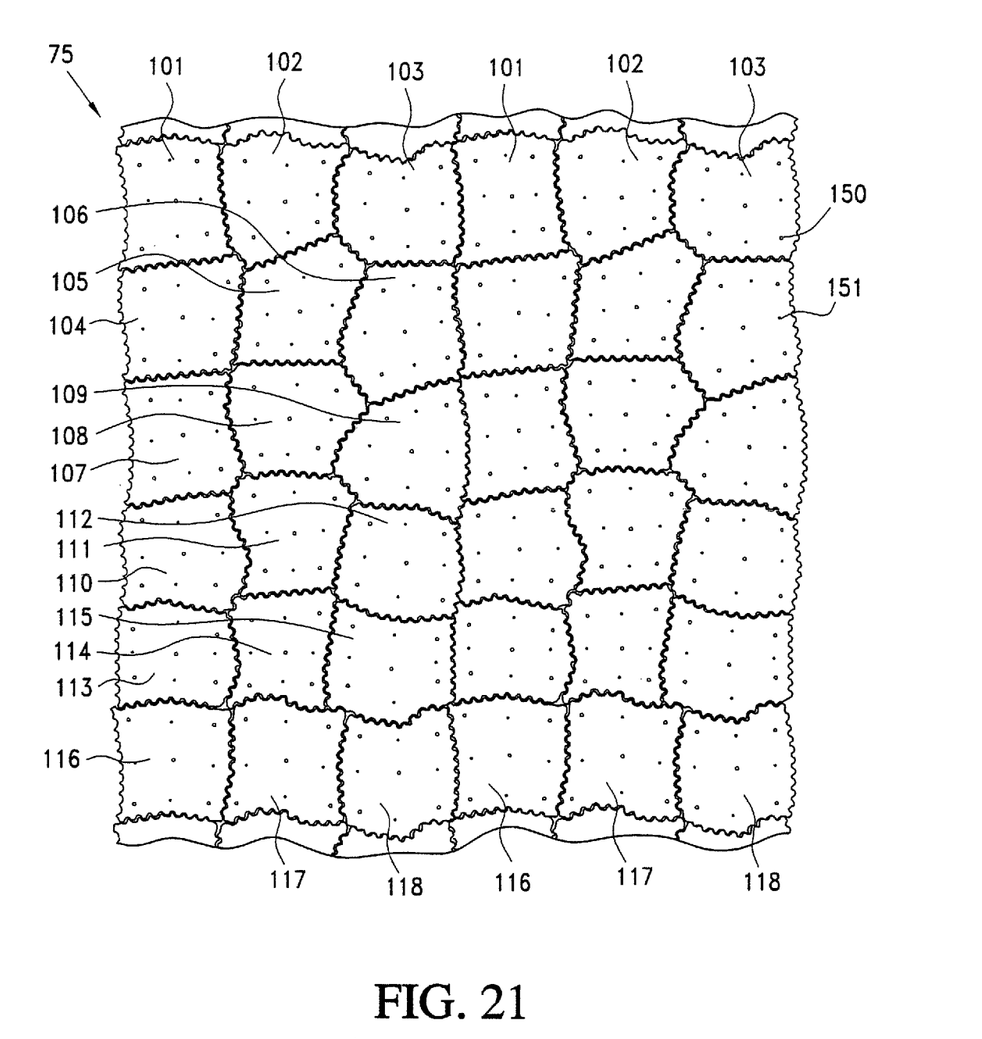
FIG. 21 shows a larger section of the rotary cutter design according to FIG. 20.

FIG. 21 shows a larger section of rotary cutter 75 according to FIG. 20 and the repeating cutting elements 101-118. As shown in FIG. 21, a dough piece shape may be repeated within a row every four to six dough pieces according to the present invention. For example, a dough piece shape may be repeated in a longitudinal row every fourth dough piece and it may be repeated in a circumferential row every seventh dough piece to obtain a plurality of arrays of different cutting elements and corresponding dough pieces. The cutting elements are preferably shaped so as to provide rounded corners, and to avoid sharp edges to reduce breakage in the baked product during transport, packaging and subsequent shipping. Additionally, the cutting elements provide sufficiently large scallops so that they are distinct and visible in the baked product.

Figure 22:
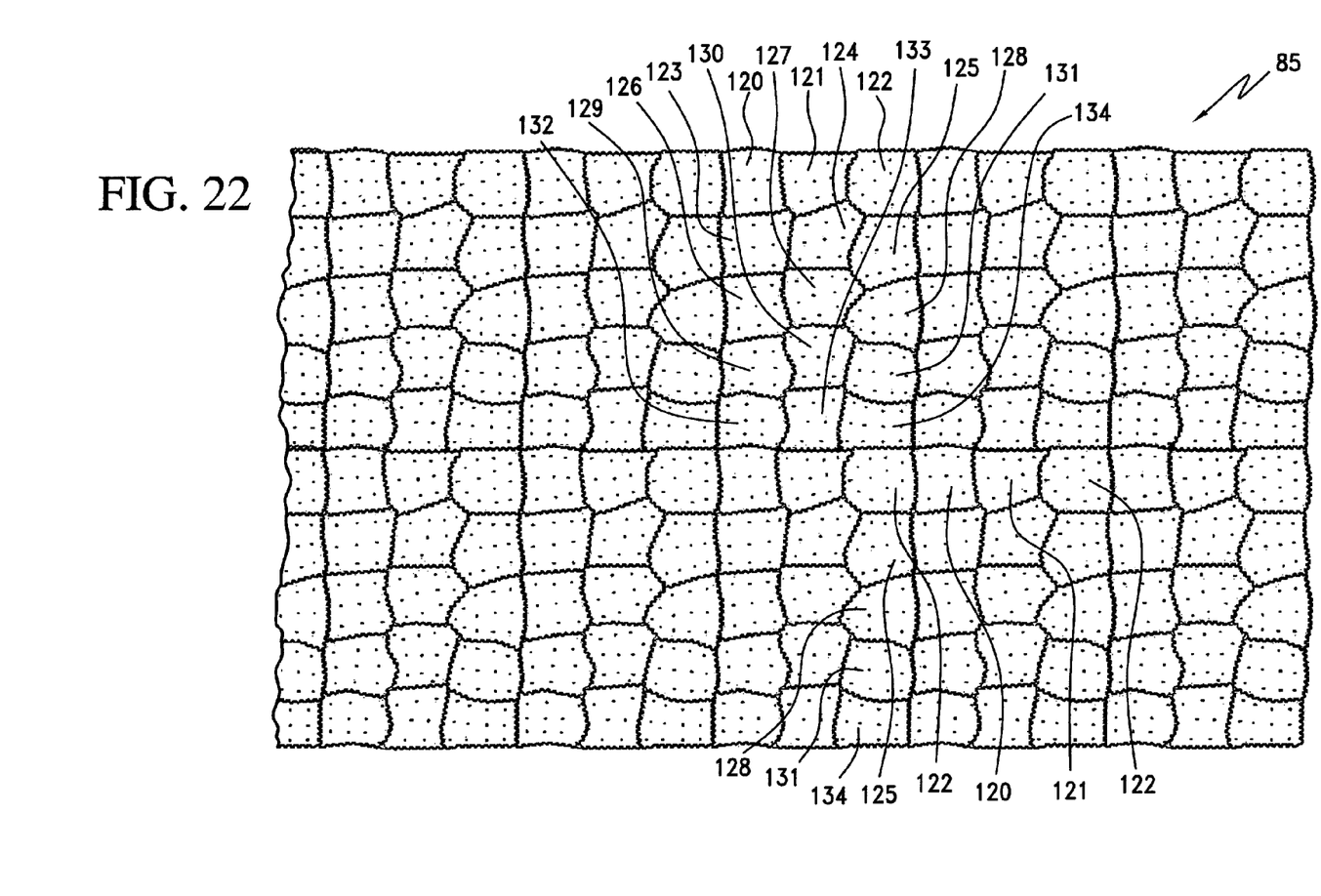
FIG. 22 shows a section of a second rotary cutter design according to the present invention having cutting edges which may be used to produce fifteen differently shaped snacks from a single dough sheet without producing interstitial dough scrap between adjacent dough pieces.

Another embodiment of a rotary cutter according to the present invention is shown in FIG. 22. In FIG. 22, rotary cutter 85 may be used to produce fifteen differently-shaped, or irregularly-shaped, snacks chips. The rotary cutter 85 has a plurality of rows of blunt-edged or rounded cutting elements 120-134 which extend circumferentially around the rotary cutter 85. Each adjacent cutting element 120-134 within each row produces a differently shaped dough piece. A dough piece shape is repeated in a longitudinal row every fourth dough piece, and is repeated in a circumferential row every sixth dough piece. Using this rotary cutter, the plurality of docker holes are all the same size.

Figure 23:
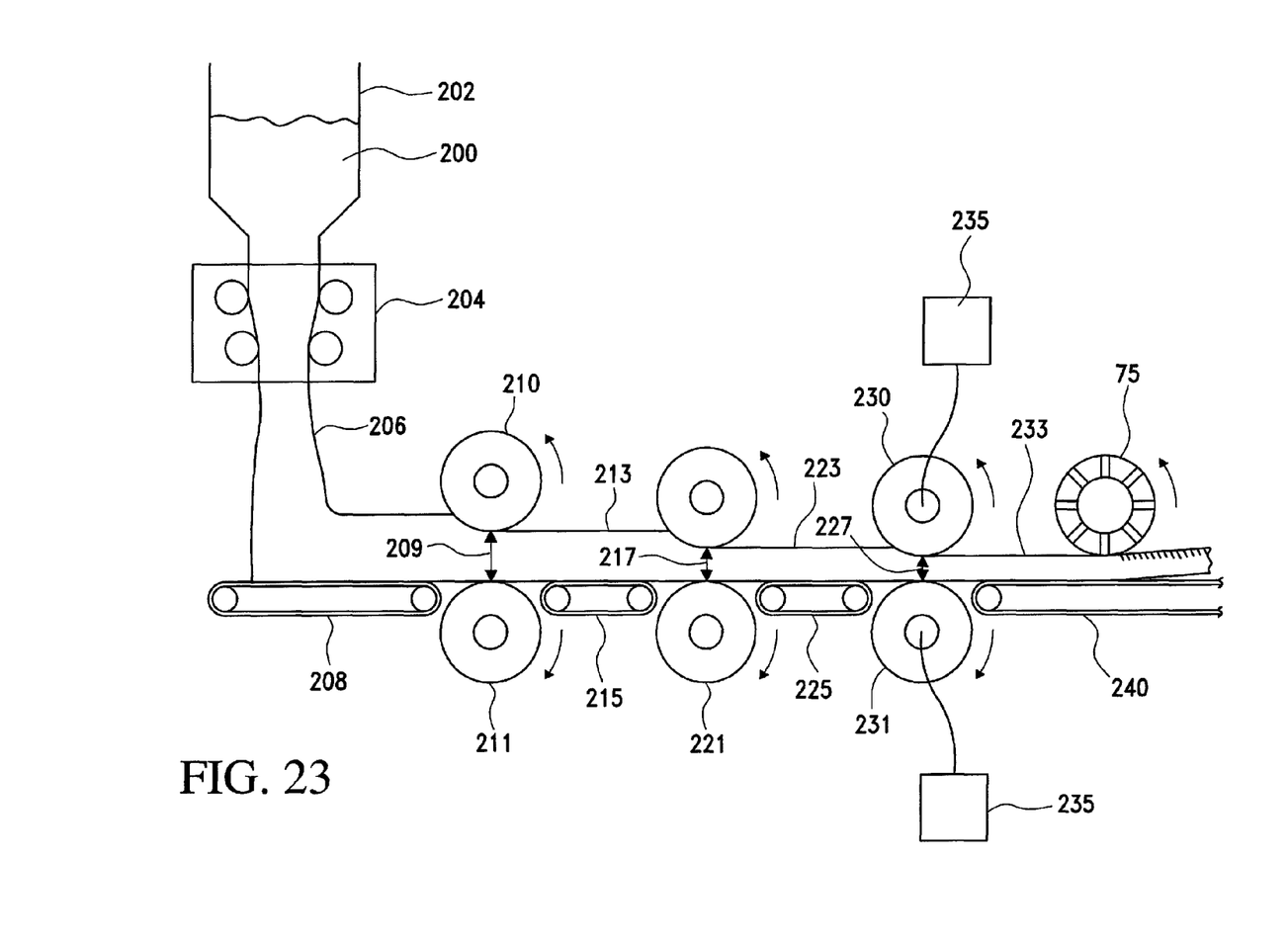
FIG. 23 is a schematic of apparatus that may be used in the production of the baked snacks of FIGS. 1-18.

A schematic of apparatus conventionally used in the production of crackers which may be employed for the continuous production of the thin, baked snacks of the present invention is shown in FIG. 23. As shown in FIG. 23, a dough 200 from hopper 202 is sheeted in a conventional four roll dough sheeter 204 to obtain a dough sheet 206. Dough sheet 206 is conveyed by conveyor 208 to the nip 209 of a pair of counterrotating auxiliary gauge rolls 210, 211 and compressed into a sheet 213. Compressed sheet 213 is transported by a second conveyer 215 to the nip 217 of a second pair of counterrotating auxiliary gauge rolls 220, 221 and further compressed into a sheet 223. Compressed sheet 223 is transported by a third conveyer 225 to the nip 227 of a pair of jacketed counterrotating final gauge rolls 230, 231 and further compressed into a thin sheet 233. The final gauge rolls 230, 231 may be equipped with a conventional temperature monitoring and controlling device 235 for control of the gauge roll surface temperatures. The final gauge rolls are preferably non-tapered. Scrapers or knife-edges on the gauge rolls, particularly the final gauge rolls, should be maintained sharp, free of burrs or other imperfections, and pressure should be applied uniformly for proper release of the sheet from the roll. The thin sheet 233 may be transferred to a fourth, downstream conveyer 240 for cutting into individual pieces by rotary cutter 75. Rotary cutter 75 may be coated with a release/wear coating such as General Magnaplate Corporation's Tufram H-O coating.

The dough compositions, methods for making them, and baking and drying conditions which may be employed in the present invention may be the same as disclosed in U.S. Pat. Nos. 5,747,092 and 5,980,967 each to Carey et al., and U.S. Pat. No. 6,491,959 to Chiang et al., the disclosures of which are herein incorporated by reference in their entireties. For example, in embodiments of the invention, as disclosed in U.S. Pat. Nos. 5,747,092 and 5,980,967 each to Carey et al., baked wheat-based snacks may be produced by admixing:

(1) an uncooked wheat flour;

(2) a pregelatinized waxy starch in an amount of from about 3% by weight to about 20% by weight, preferably from about 5% by weight to about 15% by weight, based upon the weight of the wheat flour;

(3) a pregelatinized potato starch in an amount of from about 1.5% by weight to about 20% by weight, preferably from about 3% by weight to about 13% by weight, based upon the weight of the wheat flour;

(4) from 0% by weight to about 20% by weight, preferably from about 5% by weight to about 18% by weight, of an optional modified potato starch, based upon the weight of the wheat flour; and (5) water to hydrate said starches and to form a machinable dough having a moisture content of preferably from about 23% by weight to about 38% by weight.

The total amount of the potato starches is preferably less than about 30% by weight, most preferably from about 8% by weight to about 25% by weight, based upon the weight of the wheat flour. In embodiments of the present invention, the weight ratio of the amount of the pregelatinized waxy starch to the total amount of the potato starches is from about 0.45:1 to about 1:1. Also, the ratio of the amount of pregelatinized waxy starch, such as pregelatinized waxy maize starch, to the total amount of the potato starches may be from about 1.5:1 to about 4:1. In embodiments of the invention, the snack chip may be made from a dough comprising about 30 wt. % to about 80 wt. % uncooked, or at least substantially non-gelatinized, non-pasted, wheat flour, based upon the weight of the dough. For example, the wheat flour employed is preferably ungelatinized, but in embodiments of the invention, wheat flours having a degree of gelatinization up to about 15% as measured by Differential Scanning Calorimetry (DSC) may be used.

In the most preferred embodiment, a pregelatinized potato starch which is unmodified, and not cross-linked, such as Paselli WA-4 is employed. In such embodiments, an optional modified potato starch, such as Perfectamyl AC is not needed in the production of unfermented or fermented snacks and the total amount of potato starches may be reduced. For example, in embodiments where an unmodified, non-cross-linked pregelatinized potato starch such as Paselli WA-4 is employed, exemplary total amounts of potato starches may be from about 2 wt. % to about 7 wt. %, based upon the weight of the wheat flour. The use of the unmodified, non-cross-linked potato starch requires less water to be used in making the dough.

The following examples, wherein all parts, percentages, and ratios are by weight, and all temperatures are in ° F. unless indicated to the contrary, illustrate the present invention:

EXAMPLES

The ingredients and their relative amounts, which may be used to produce a cohesive, machinable dough for producing an unfermented, wheat-based snack having a plurality of surface bubbles, a crispy, crunchy, chip-like texture and cracker flavor, are:

| Dough Ingredients | Example 1 Parts by weight | Example 2 Parts by weight | Example 3 Parts by weight |
|---|---|---|---|
| Medium wheat flour | 100 | 100 | 100 |
| Pregelatinized waxy maize starch No. 3 (X-Pand'R) | 11.11 | 11.11 | 11.11 |
| Pregelatinized potato starch No. 1 (Paselli WA-4) | 4.08 | 4.08 | 4.08 |
| Granulated Sugar (sucrose) | 8.89 | 8.89 | 8.88 |
| Soybean Spray Oil | 6.67 | 6.67 | 6.67 |
| High fructose corn syrup | 5.56 | 5.56 | 5.56 |
| Sodium bicarbonate, powdered (TCP added) | 1.25 | 1.25 | 1.25 |
| Calcium phosphate, monobasic monohydrate | 1.25 | 1.25 | 1.25 |
| Ammonium bicarbonate | 1.25 | 1.25 | 1.25 |
| Dough Salt | 0.69 | 0.69 | 0.69 |
| Water | 31.0 | 34.16 | 34.16 |
| TOTAL | 171.75 | 174.91 | 174.89 |

Example 1

The dough may be formed by first blending the sucrose, pregelatinized waxy maize starch, and pregelatinized potato starch via a mixer at low speed (about 20 rpm) for about 30 seconds. Paselli WA4 is an unmodified, non-crosslinked, pregelatinized potato starch that is cold water swelling. Paselli WA4 has a moisture content of about 8.75% by weight, a sulfated ash content of 0.8% maximum, and a pH in a 5% aqueous solution of about pH 6. The particle size distribution of Paselli WA4 may be less than or equal to 25% on a #45 screen.

About 75% by weight of the water may be preheated to a temperature of about 145-165° F. and admixed with the blend for about 2 minutes at a mixer speed of about 20 rpm to substantially hydrate the pregelatinized waxy maize starch and pregelatinized potato starch.

The soybean oil, high fructose corn syrup, and most of the remaining water may be admixed with the blend for about 1 minute at a mixer speed of about 20 rpm. The flour, salt, sodium bicarbonate, and calcium phosphate may then be added.

Finally, the ammonium bicarbonate, which may be dissolved in about 2.50 parts water at about 90° F., may be added to the blend at a mixer speed of about 20 rpm for about 6 minutes. The resulting dough may have a temperature of about 98° F. to about 104° F.

The dough may be placed onto a laytime conveyor for about 60 minutes for hydration purposes. The dough may then be transferred to a sheeter and formed into a sheet. Once the sheet is formed, it may be reduced in thickness in gradual stages by at least two sets of non-tapered reduction rolls. Equipment for the application of conditioned air may be available to reduce sticking of the dough sheet to the surface of the rolls.

The dough sheet may be passed through the final gauge rolls and sheeted. To allow for proper release of the sheet, the final gauge roll surface temperature may be maintained and controlled between about 87-95° F. by, for example, an internally circulating liquid.

For a 0.017 inch gap in the final gauge roll, the corresponding dough thickness will be about 0.020 inch due to expansion of the dough after passing through the final gauge roll. For a 0.022 inch gap in the final gauge roll, the corresponding dough thickness will be about 0.028-0.029 inch. For a 0.030 inch gap in the final gauge roll, the corresponding dough thickness will be about 0.036-0.037 inch.

The dough may then be placed on a conveyor and then fed to a cutter apron. The residence time between the final gauge roll and the cutter apron may be approximately 1.7 seconds at production speeds. The sheet may then be cut into a plurality of irregularly shaped pieces having scalloped edges with a rotary tied cutter. The cutter may have a speed of about 12 rpm or greater and the corresponding line speeds may be up to about 130 feet/minute. The product may then be placed on an oven band using a pan-on conveyor and baked.

The following Tables show the gap settings, temperatures, cutter speeds, line speeds, and baking times for the production of thin, irregularly shaped pieces at a pilot plant using a dough as produced in Example 1:

| Unit Operations | Gap Setting (inch) | Dough Temp (° F.) |
|---|---|---|
| Three Roll Sheeter | 0.200 | 85.0 |
| Reduction Stand | 0.122 | 78.0 |
| Laminator | 6 layers @1.05 in | 76.5 |
| 1st Auxiliary Gauge Roll | 0.183 | 75.5 |
| 2nd Auxiliary Gauge Roll | 0.060 | 75.8 |
| Final Gauge Roll | 0.017 | 88.0 |
| Cutter | 12 rpm @28.5 FT/MIN | 78.0 |
| Oven | 35.5 FT/MIN | 77.0 |
| | Bake Time 2.9 min | |
| Three Roll Sheeter | 0.206 | 89.0 |
| Reduction Stand | 0.122 | 86.0 |
| Laminator | 6 layers @1.05 in | 83.0 |
| 1st Auxiliaxy Gauge Roll | 0.180 | 80.0 |
| 2nd Auxiliary Gauge Roll | 0.065 | 79.0 |
| Final Gauge Roll | 0.030 | 87-89 |
| Cutter | 12 rpm @28.0 FT/MIN | 78-79 |
| Oven | 35.5 FT/MIN | 77-78 |
| | Bake Time 2.9 min | |
| Three Roll Sheeter | 0.206 | 94.0 |
| Reduction Stand | 0.125 | 91.0 |
| Laminator | 6 layers @1.2 in | 88.0 |
| 1st Auxiliary Gauge Roll | 0.188 | 88.0 |
| 2nd Auxiliary Gauge Roll | 0.067 | 87.0 |
| Final Gauge Roll | 0.022 | 91.0 |
| Cutter | 12 rpm @28.5 FT/MIN | 85-88 |
| Oven | 31.4 FT/MIN | 85.0 |
| | Bake Time 3.3 min | |
| Three Roll Sheeter | 0.207 | 89.0 |
| Reduction Stand | 0.127 | 86.0 |

-continued

| Unit Operations | Gap Setting (inch) | Dough Temp (° F.) |
|---|---|---|
| Laminator | 6 layers @1.45 in | 84.0 |
| 1st Auxiliary Gauge Roll | 0.180 | 82.0 |
| 2nd Auxiliary Gauge Roll | 0.067 | 82.0 |
| Final Gauge Roll | 0.022 | 88.0 |
| Cutter | 12 rpm @28.3 FT/MIN | 85.0 |
| Oven | 34.2 FT/MIN Bake Time 3.03 min | 84.0 |
| Three Roll Sheeter | 0.207 | 92.0 |
| Reduction Stand | 0.128 | 89.0 |
| Laminator | 6 layers @1.5 in | 86.0 |
| 1st Auxiliary Gauge Roll | 0.180 | 84.0 |
| 2nd Auxiliary Gauge Roll | 0.067 | 83.0 |
| Final Gauge Roll | 0.022 | 91.0 |
| Cutter | 12 rpm @28.1 FT/MIN | 87.0 |
| Oven | 33.8 FT/MIN Bake Time 3.03 min | 85.0 |

Examples 2-3

A dough may be made according to the process of Example 1. The baked dough may be topped with topping ingredients as follows:

| | Weight | Weight % |
|---|---|---|
| Example 2 | | |
| Baked Dough | 125 lbs. 3.90 oz | 88.2 wt. % |
| Soybean Spray Oil | 14 lbs. 4.45 oz. | 10.1 wt. % |
| Flour Salt | 2 lbs. 7.08 oz. | 1.7 wt. % |
| Example 3 | | |
| Baked Dough | 125 lbs. 3.63 oz | 79.0 wt. % |
| Soybean Spray Oil | 23 lbs. 12.44 oz. | 15.0 wt. % |
| Sour Cream and Onion Seasoning | 9 lbs. 8.17 oz. | 6.0 wt. % |

The dough of Examples 2 and 3 may be sheeted and fed to water-chilled final gauge rollers having a gap of 0.034 inches to obtain an average dough sheet thickness of 0.0345 inch (0.030 inch minimum and 0.042 inch maximum). The chilled water temperature for the final gauge rollers may be about 40° F. to about 42° F. The temperature of the dough in the lay-time conveyor may be about 97° F. The temperature of the dough after the four-roll sheeter may be about 92° F. The temperature of the dough just before the final gauge rollers may be about 88° F. The temperature of the dough after the final gauge rollers may be about 85° F. The sheeted and compressed dough may then be fed to a rotary cutter apron having the cutting elements as shown in FIG. 20 and FIG. 21 to form differently-shaped, irregular dough pieces. The dough pieces may be baked to a moisture content of about 1.7 wt. % to obtain snack chips as shown in FIGS. 1-18.

What is claimed is:

1. An apparatus for producing thin, irregularly shaped, scallop-edged baked chips, comprising:
   a pair of counterrotating gauge rolls for producing a thin dough sheet, wherein the nip or gap between the counterrotating gauge rolls is less than or equal to about 0.035 inches, and
   a rotary cutter for cutting said thin dough sheet into a plurality of differently shaped dough pieces without producing interstitial dough between the pieces, each of the pieces having scalloped edges;
   said rotary cutter having a plurality of circumferential rows of cutting elements which extend circumferentially around the rotary cutter, wherein adjacent cutting elements within each circumferential row produce a differently shaped dough piece, and adjacent cutting elements within adjacent circumferential rows produce a differently shaped dough piece.

2. An apparatus as claimed in claim 1, wherein the nip or gap between the counterrotating gauge rolls is less than or equal to 0.030 inches.

3. An apparatus as claimed in claim 1, wherein said rotary cutter has blunt cutting edges for cutting said dough sheet into pieces.

4. An apparatus as claimed in claim 1, wherein said cutter cuts the dough into pieces which each have at least one concave or convex edge.

5. An apparatus as claimed in claim 1, wherein said cutter has dockering pins for producing a plurality of two sizes of docker holes in each dough piece.

6. An apparatus as claimed in claim 1, wherein said gauge rolls have jackets for a heat exchange medium, a temperature monitor and temperature controller for maintaining the surface of the gauge rolls at a desired temperature.

7. An apparatus as claimed in claim 1, further comprising at least one pair of counterrotating auxiliary rolls are arranged upstream of said gauge rolls for reducing the thickness of a dough sheet for feeding to said nip or gap of the gauge rolls.

8. An apparatus as claimed in claim 7, further comprising an upstream conveyor for transferring a dough sheet obtained from said at least one pair of auxiliary rolls into said nip or gap, and a downstream conveyor for receiving said thin dough sheet from the nip or gap of the gauge rolls and for transferring said thin dough sheet to said rotary cutter.

9. An apparatus as claimed in claim 1, wherein said gauge rolls are untapered along their lengths.

10. An apparatus as claimed in claim 1, wherein a dough piece shape is repeated in a circumferential row.

11. An apparatus as claimed in claim 10, wherein said rotary cutter has a plurality of longitudinal rows of cutting elements which extend longitudinally along the length of the rotary cutter, and a dough piece shape is repeated in a longitudinal row.

* * * * *